United States Patent
Muthurajan et al.

(10) Patent No.: US 10,650,148 B2
(45) Date of Patent: May 12, 2020

(54) DETERMINE PROTECTIVE MEASURE FOR DATA THAT MEETS CRITERIA

(71) Applicant: HEWLETT PACKARD ENTERPRISE DEVELOPMENT LP, Houston, TX (US)

(72) Inventors: Sasi Muthurajan, Alpharetta, GA (US); Matias Madou, Diegem (BE); Ronald J. Sechman, Alpharetta, GA (US); Jeremy Brooks, Alpharetta, GA (US)

(73) Assignee: MICRO FOCUS LLC, Santa Clara, CA (US)

( * ) Notice: Subject to any disclaimer, the term of this patent is extended or adjusted under 35 U.S.C. 154(b) by 120 days.

(21) Appl. No.: 15/500,521

(22) PCT Filed: Sep. 4, 2014

(86) PCT No.: PCT/US2014/053992
§ 371 (c)(1),
(2) Date: Jan. 30, 2017

(87) PCT Pub. No.: WO2016/036368
PCT Pub. Date: Mar. 10, 2016

(65) Prior Publication Data
US 2017/0220804 A1    Aug. 3, 2017

(51) Int. Cl.
*G06F 21/00* (2013.01)
*G06F 21/57* (2013.01)
(Continued)

(52) U.S. Cl.
CPC ........ *G06F 21/577* (2013.01); *G06F 11/3692* (2013.01); *G06F 21/52* (2013.01);
(Continued)

(58) Field of Classification Search
None
See application file for complete search history.

(56) References Cited

U.S. PATENT DOCUMENTS

| | | | |
|---|---|---|---|
| 6,473,794 B1 * | 10/2002 | Guheen | H04L 41/22 709/223 |
| 6,519,571 B1 * | 2/2003 | Guheen | G06Q 30/02 705/14.66 |

(Continued)

FOREIGN PATENT DOCUMENTS

TW        201204011 A    1/2012

OTHER PUBLICATIONS

Watanabe, Takanobu et al. A New Security Testing Method for Detecting Flash Vulnerabilities by Generating Test Patterns. 2010 13th International Conference on Network-Based Information Systems. https://ieeexplore.ieee.org/stamp/stamp.jsp?tp=&arnumber=5636221 (Year: 2010).*

(Continued)

*Primary Examiner* — Jeremiah L Avery (57) ABSTRACT

Example embodiments disclosed herein relate to determining whether a protective measure meeting criteria has been performed on data. Execution of an application under test (AUT) is monitored. A message that a field of the AUT should be considered sensitive is received. Data is determined to be entered into the field. The data is monitored during execution of the AUT to determine whether the protective measure that meets the criteria has been performed on the data.

16 Claims, 4 Drawing Sheets

(51) Int. Cl.
  *H04L 29/06* (2006.01)
  *H04L 29/08* (2006.01)
  *G06F 21/52* (2013.01)
  *G06F 11/36* (2006.01)

(52) U.S. Cl.
  CPC ......... *H04L 63/1433* (2013.01); *H04L 67/02* (2013.01); *G06F 2221/033* (2013.01); *G06F 2221/2101* (2013.01); *G06F 2221/2103* (2013.01)

(56) References Cited

U.S. PATENT DOCUMENTS

| | | | | |
|---|---|---|---|---|
| 6,536,037 B1* | 3/2003 | Guheen | ...................... | G06F 8/71 703/2 |
| 6,704,873 B1* | 3/2004 | Underwood | ............ | H04L 63/02 709/223 |
| 7,761,923 B2* | 7/2010 | Khuti | ...................... | H04L 63/02 726/11 |
| 8,005,458 B2 | 8/2011 | Baik et al. | | |
| 8,726,392 B1 | 5/2014 | McCorkendale et al. | | |
| 2003/0233581 A1* | 12/2003 | Reshef | .................. | G06F 21/554 726/25 |
| 2005/0160272 A1* | 7/2005 | Teppler | ..................... | H04L 9/12 713/178 |
| 2005/0257266 A1* | 11/2005 | Cook | ........................ | G06F 8/61 726/23 |
| 2005/0273854 A1* | 12/2005 | Chess | .................. | G06F 21/577 726/22 |
| 2005/0273860 A1* | 12/2005 | Chess | .................. | G06F 21/577 726/25 |
| 2010/0212010 A1 | 8/2010 | Stringer et al. | | |
| 2011/0099375 A1* | 4/2011 | Hammes | ................. | G06F 21/31 713/168 |
| 2012/0167162 A1* | 6/2012 | Raleigh | ................... | G06F 21/57 726/1 |
| 2013/0152047 A1* | 6/2013 | Moorthi | ................ | G06F 11/368 717/124 |
| 2013/0174263 A1 | 7/2013 | Nunez Di Croce | | |
| 2013/0198320 A1 | 8/2013 | Ahmed et al. | | |
| 2014/0082739 A1 | 3/2014 | Chess et al. | | |
| 2014/0245460 A1* | 8/2014 | Sum | ...................... | G06F 21/577 726/28 |

OTHER PUBLICATIONS

Mouelhi et al. Transforming and Selecting Functional Test Cases for Security Policy Testing. 2009 International Conference on Software Testing Verification and Validation. https://ieeexplore.ieee.org/stamp/stamp.jsp?tp=&arnumber=4815349 (Year: 2009).*
Egele, M., et al., "An Empirical Study of Cryptographic Misuse in Android Applications", Nov. 4-8, 2013, CCS'13, 11 pages.
Shankdhar, P., "Protect Data by Preventing Insecure Cryptographic Storage", Sep. 16, 2013, InfoSec Institute, 13 pages.
Tozzir, H.M., "Insecure Cryptographic Storage on Web Application", Retrieved from the Internet, Jun. 24, 2015, Maridadi Agency—Return of the Kingdom, 7 pages.
TW Office Action dated Jun. 23, 2016, TW Patent Application No. 104129161 filed Sep. 3, 2015, Taiwan Intellectual Property Office, 10 pages.

* cited by examiner

DETERMINE PROTECTIVE MEASURE FOR DATA THAT MEETS CRITERIA

BACKGROUND

Software security testing is used to identify vulnerabilities in an application such as a Web application. Traditional black-box security testing for Web-based software works by using a security testing application, often referred to as a scanner, which poses as an attacker. In a black-box approach, the scanner explores an Application Under Test (AUT) by making Hypertext Transfer Protocol (HTTP) requests and evaluating the HTTP responses in order to find all of the URLs where the AUT accepts input. The URLs where the AUT accepts input may be referred to the attack surface of the AUT. The scanner then creates attacks based on the attack surface and likely categories of vulnerabilities. The scanner applies the attacks to diagnose the presence or absence of vulnerabilities by evaluating the program's HTTP responses.

BRIEF DESCRIPTION OF THE DRAWINGS

The following detailed description references the drawings, wherein.

DETAILED DESCRIPTION

A web application vulnerability scanner is an approach for identifying vulnerabilities in a web application. A scanner starts by crawling the application under test (AUT) to identify the attack surface. A runtime agent or observer can be installed on the application server to assist with identifying the attack surface more accurately. As described herein, a software program referred to herein as an observer or runtime agent is used to watch the internal operations performed by the AUT. The runtime agent enables the scanner to determine the operation of the AUT and how it behaves in response to attacks. The runtime agent can also enable the scanner to determine the behavior of the AUT in response to normal application requests, which the scanner may use to determine what types of attacks to send. The scanner continues to deliver attacks to the AUT, and the scanner receives knowledge of the internal workings of the AUT from the runtime agent. In this way, the scanner can find more vulnerabilities and produce better vulnerability reports, thereby providing a more comprehensive and detailed software security test of web-based applications.

Detecting server-side bugs or flaws that involve handling of sensitive information can be a challenge for automated dynamic scanners. Scanners can detect data that is leaked to the client, but automatically detecting insecure storage of information on the server is a more challenging task. While storing private or sensitive information is not problematic by itself as it is not directly leaked to the client, an attacker could leverage other problems in the application to reach the weakly protected data. The impact of a successful data extraction can be as severe as most other breaches where sensitive information is stolen. Hence, it is beneficial to be able to detect and fix such issues in the application.

Web applications should store sensitive information securely. A challenge is to detect when an application is not using adequate protections (e.g., strong cryptographic techniques, secure hashing, etc.) to store sensitive information. Many common bugs and flaws include not encrypting sensitive information, using weak procedures, or misusing the procedures.

Typical static analysis can identify the absence of cryptographic routines, but without any context of what the data is. With dynamic testing, sensitive data can be identified, but the backend operations become opaque.

Accordingly, various embodiments described herein relate to being able to identify sensitive data from the client and reliably verify the way such data is handled in the application. A dynamic scanner and a runtime agent installed within the application server can be used to track sensitive information in the application. The dynamic scanner can identify information as it acts as the client and submits values to the server. The runtime agent within the server tracks these values before it reaches the datastore and can look for well-known and reliable cryptographic function calls along the execution path. If no call or a call to a weak cryptographic function is detected, then this information is communicated back to the scanner and flagged as a potential vulnerability.

The runtime agent can be responsible for identifying the usage of cryptographic application programming interfaces (APIs) while the scanner detects the attack surface, identifies potential sensitive information, and performs analysis on the results sent back by the agent.

Figure 1:
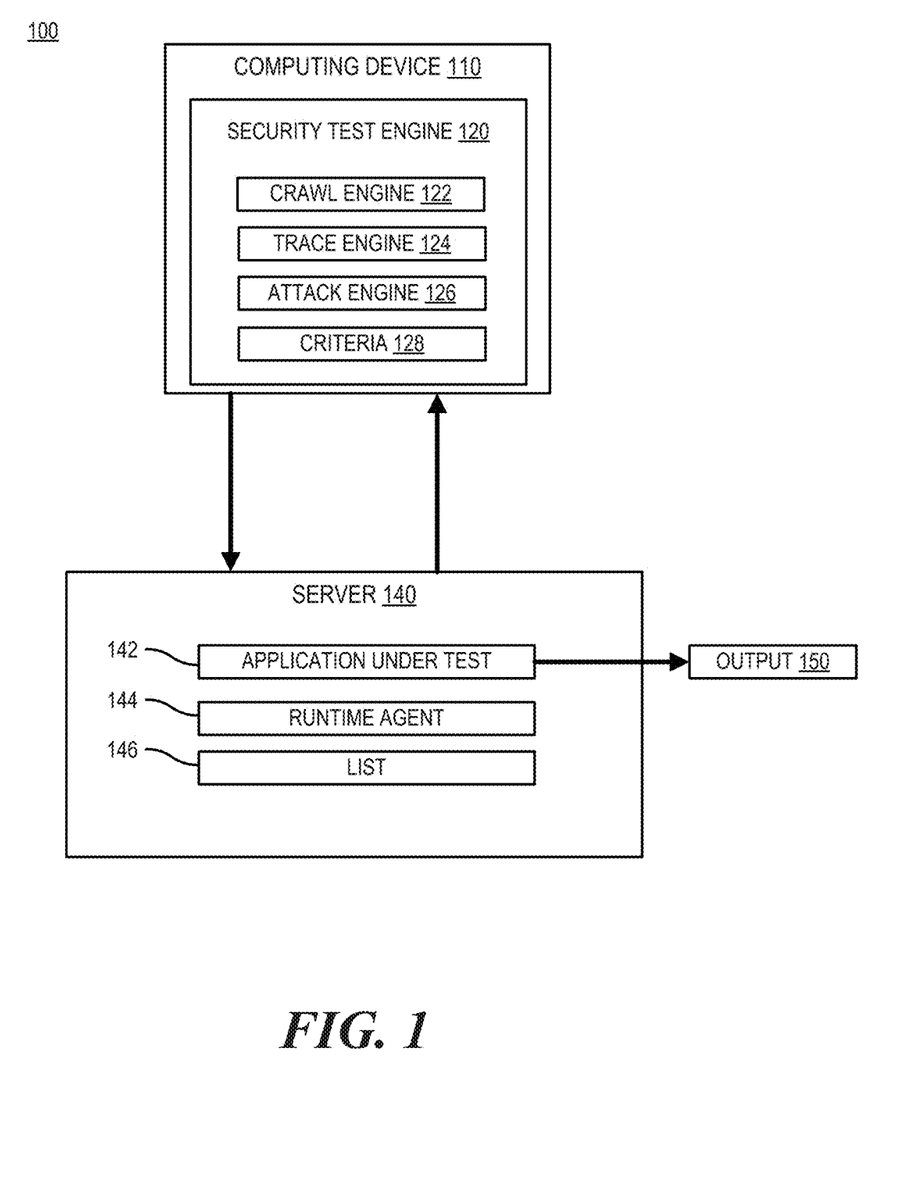
FIG. 1 is a block diagram of a system capable of tracking execution of an Application Under Test to determine whether an adequate protective measure is performed on data entered into a sensitive field, according to one example.

FIG. 1 is a block diagram of a system capable of tracking execution of an Application Under Test to determine whether an adequate protective measure is performed on data entered into a sensitive field, according to one example. Computing device 110 and server 140 include components that can be utilized to perform a security test. The respective devices 110, 140 may be a notebook computer, a desktop computer, a server, a workstation, or any other computing device capable of performing the recited functionality. In certain examples, a server is a system that can respond to requests over a computer network to provide or help provide a network service. Further, in certain examples, the computing device 110 can include a security test engine 120, which may further include a crawl engine 122, a trace engine 124, and an attack engine 126. Further, the server 140 may include an application under test 142, a runtime agent 144, and a list of processes to look for 146. Communications between the computing device 110 and the server 140 may be conducted using a request-response protocol such as the Hyper-Text Transfer Protocol (HTTP).

The security test engine 120 can perform security tests on the AUT, for example, a scan. As noted, the computing device 110 can be communicatively coupled to the AUT 142 via a common communication channel. In the crawl phase, the crawl engine 122 crawls the AUT 142, which allows the security test engine 120 to be able to identify an attack surface. This can be done by fetching attack surface information from the server-side runtime agent 144, following links, executing scripts, etc. One or more parts of the attack surface can include fields of the AUT 142. The fields can include fields that can be considered sensitive. Such fields can include information that may be validated such as a password, token, pin, etc. and/or stored such as a social security number, a credit card number, configurable information, etc. In some examples, the security test engine 120 can determine that one or more of the fields should be considered sensitive. This can be based on input, a context (e.g., based on a word search of a page presented with the field), etc.

When the security test engine 120 comes across sections of the application that require sensitive information to be submitted, the specific information is marked so that the runtime agent can detect and act on it. As noted, sensitive information could refer to user credentials, social security numbers, credit card numbers, or anything else deemed "sensitive" by a user. The trace engine 124 can send a message to the runtime agent 144 indicating that the field should be considered sensitive and/or that specific data from the field should be considered sensitive/traced.

During an attack phase, the attack engine 126 can perform attack vectors on the AUT 142 and can enter data into the field. When the security test engine 120 identifies submission of sensitive information, it can specifically flag that information via the message to indicate that the agent should observe these values. This could be implemented by using a custom request header to specify the values of interest and/or the field to monitor.

This request can be followed up by a trace request to the agent that can contain details of the cryptographic APIs and/or the storage APIs called using the flagged values. This will allow the scanner to flag a vulnerability based on this information. Some of the cases it may look for are as follows: sensitive information is written to a data store without any encryption or hashing; sensitive information is written to a data store after using a weak cryptographic function; sensitive information is encrypted or hashed without salting.

The runtime agent 144 can receive the message and monitor or track the data entered into the field. As such, the data can be monitored by the runtime agent 144 to determine whether a protective measure is performed on the data based on list 146. In certain examples, the monitoring can be in response to reception of the data, reception of a message marking the data as sensitive, monitoring of the field, etc. This can be used to facilitate determination of whether the protective measure(s) used meet criteria 128.

In one example, the runtime agent 144 can determine a type of the data. The type can be based on a message received from the security test engine 120. The message can indicate the type by saying why the sensitive field or data is sensitive. This can be incorporated into the message from the security test engine 120 that the field is sensitive and/or as part of another communication.

The type can be used to choose criteria 128. In one example, the type of data can be used to determine a list of recommended protective measures for the data. Further, the list can be based on an output 150 of the data. The output 150 can be output from the AUT 142 (e.g., to a log, to storage, to another application, etc.) and/or to other modules within the AUT 142.

Determining whether a protective measure is performed that meets the criteria 128 can be implemented using rules, lookup tables, lists, other data structures, etc. A whitelist approach can be used. For example, known or assumed secure algorithms and/or salting functions can be marked as adequate protective measures. Custom algorithms may be used by developers. These algorithms can be added as assumed secure or not be added. If not added, these can be flagged as something the developers may want to consider to make the AUT 142 more secure.

In certain examples, there can be two types of sensitive data, data which the user submits and is validated (e.g., passwords) and data which the AUT 142 is to retrieve on demand (e.g., credit card number for an automatic monthly payment, a social security number, etc.). In one example, the criteria 146 for data that is to be validated can include hashing processes. Further, in some examples, salted hashing processes can be included as what is considered adequate protective measures for this type of data. In another example, the criteria 128 for data that is to be retrieved can include encryption processes. Processes can include particular cryptographic functions and/or APIs. In some examples, the runtime agent 144 can determine whether the protective measures meet the criteria. In other examples, the runtime agent 144 sends information back to the security test engine 120 to make the determination.

The engines, modules, and parts described herein can be distributed between one or more devices. The engines 120, 122, 124, 126 include hardware and/or combinations of hardware and programming to perform functions provided herein. Moreover, modules can include programming functions and/or combinations of programming functions to be executed by hardware as provided herein. When discussing the engines and modules, it is noted that functionality attributed to an engine can also be attributed to a corresponding module and vice versa. Moreover, functionality attributed to a particular module and/or engine may also be implemented using another module and/or engine. Examples of modules and engines include the security test engine 120, crawl engine 122, trace engine 124, attack engine 126, application under test 142, and runtime agent 144.

A processor, such as a central processing unit (CPU) or a microprocessor suitable for retrieval and execution of instructions and/or electronic circuits can be configured to perform the functionality of any of the engines and/or modules described herein. In certain scenarios, instructions and/or other information, such as rules or criteria, can be included in memory. Input/output interfaces may additionally be provided by the devices. For example, input devices, such as a keyboard, a sensor, a touch interface, a mouse, a microphone, etc. can be utilized to receive input from an environment surrounding the devices. Further, an output device, such as a display, can be utilized to present information to users. Examples of output devices include speakers, display devices, amplifiers, etc. Moreover, in certain embodiments, some components can be utilized to implement functionality of other components described herein. Input/output devices such as communication devices like network communication devices or wireless devices can also be considered devices capable of using the input/output interfaces.

Each of the engines/modules may include, for example, hardware devices including electronic circuitry for implementing the functionality described herein. In addition or as an alternative, each module may be implemented as a series of instructions encoded on a machine-readable storage medium of computing device and executable by a processor. It should be noted that, in some embodiments, some modules are implemented as hardware devices, while other modules are implemented as executable instructions.

Figure 2:
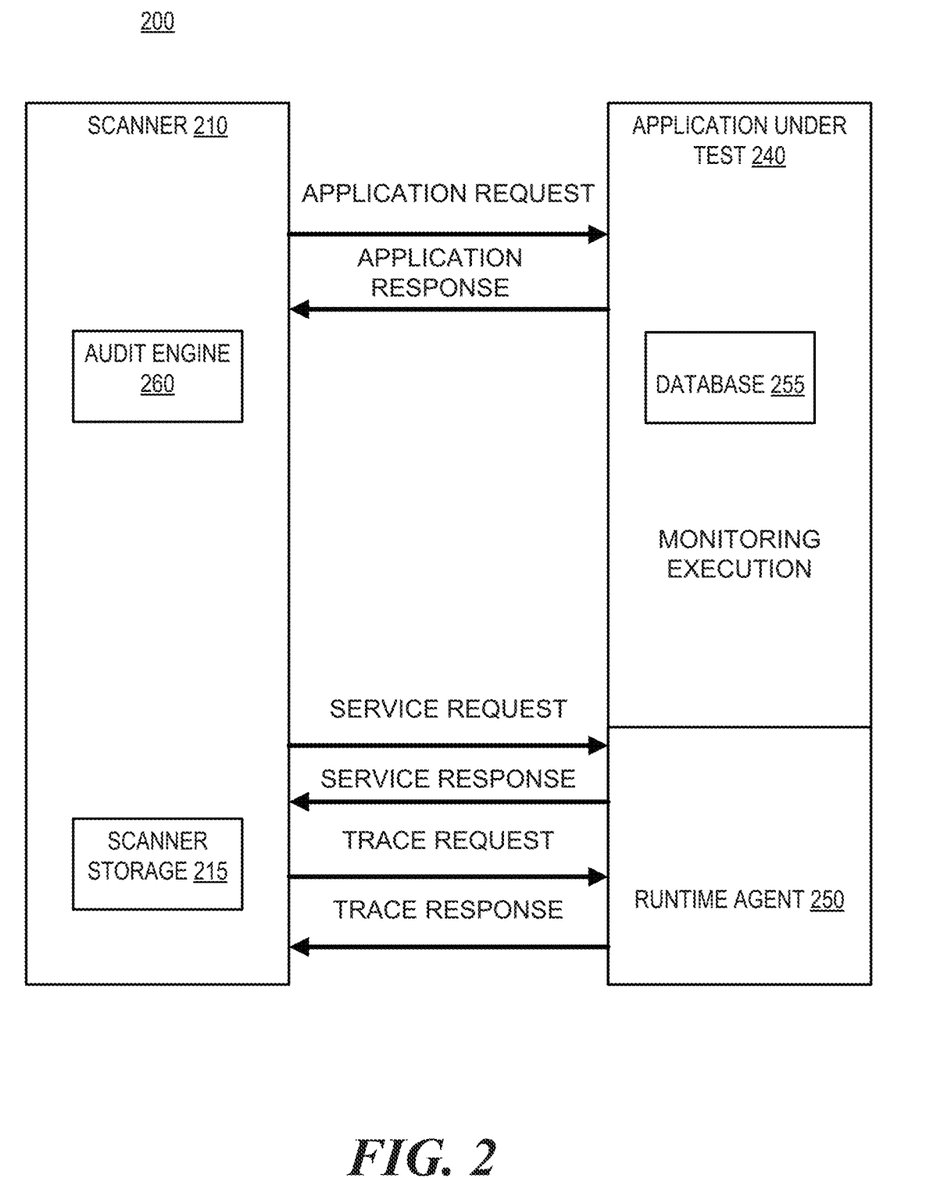
FIG. 2 is a block diagram of a system capable of tracking execution of an Application Under Test to determine whether an adequate protective measure is performed on data entered into a sensitive field, according to one example.

FIG. 2 is a block diagram of a system capable of tracking execution of an Application Under Test to determine whether an adequate protective measure is performed on data entered into a sensitive field, according to one example. The system 200 may include the scanner 210, the AUT 240, and the runtime agent 250. A database 255 can be used to store information used by the AUT 240. Further, scanner storage 215 can be used to store information (e.g., vulnerabilities, configuration information, attack vectors, etc.). The AUT 240 may be encoded in any suitable Web-based computer language, such as JAVA, or .NET, among others. The AUT 240 may operate within a suitable software framework, such as Struts, Struts 2, ASP.NET MVC, Oracle WebLogic, and Spring MVC, or the like. The software framework includes a set of common code modules that provide generic functionality, which can be selectively overridden or specialized by user code to providing specific functionality. The AUT 240 may be configured to execute one or more instances of a Java Virtual Machine (JVM), Common Language Runtime (CLR), other runtime environment for processing requests from the scanner 210. The programming instructions provided by the common code modules of the software framework or runtime environment may be referred to as container code. Custom programming instructions specific to the AUT 240 may be referred to as user code.

The AUT 240 can include a network interface for enabling communications between the scanner 210 and the AUT 240 through a network. The network interface exposes the attack surface of the AUT 240 and can be the same interface that would eventually be used to provide access to the AUT 240 when the AUT 240 is made available for general use. Communication between the scanner 210 and the AUT 240 over the network interface may be conducted through HTTP requests issued from the scanner 210 to the AUT 240 and HTTP responses issued from the AUT 240 to the scanner 210. Requests targeting the AUT 240 may be referred to as application requests, and responses received from the AUT 240 may be referred to as application responses. The application requests generated by the scanner 210 may be configured to expose potential vulnerabilities of the AUT 240.

The AUT 240 may be coupled to a file system, a database 255, and other resources used by the AUT 240. The database 255 may include a variety of user information such as a table of usernames and passwords used to grant access to various resources of the AUT 240, for example. The file system may include data and programs used by the AUT 240, as well data which may be requested by a user such as HTTP pages, software programs, media files, and the like. The database 255 may be part of a system including the AUT 240 and/or be external to the system.

The runtime agent 250 can operate within the execution environment of the AUT 240 and has access to the internal operations performed by the AUT 240. For example, the runtime agent 250, in certain examples, may modify the bytecode of the AUT 240 by injecting additional code, such as a JAVA class, at various program points. The injected code acts as a monitor that observes the AUT 240. The injected monitor code may be located at strategic program points in the AUT 240, for example, application programming interface (API) calls that perform specific operations such as reading a URL parameter or writing to the file system. Whenever such a program point in the AUT 240 is executed, the monitor calls into services provided by the runtime agent 250 to record operations performed by AUT 240. The runtime agent 250 may be coupled to a buffer for storing information that has been collected regarding the internal operations of the AUT 240. The buffer may be used to store data that has been collected but has not yet been reported to the scanner 210. The buffer may be stored in non-volatile storage medium such as a hard disk, solid state drive, and the like.

The runtime agent 250 may also include an additional network interface for enabling communications between the runtime agent 250 and the scanner 210 through the network. As noted above, both network interfaces may use the same communication channel, for example, the same HTTP channel. Communications between the scanner 210 and the runtime agent 250 may be implemented through the use of custom request and response headers. Custom headers may be added to the application requests by the scanner 210, and custom headers may be added to the application responses by the runtime agent 250. In this way, at least some of the communications between the scanner 210 and the runtime agent 250 may be piggy-backed on normal communications with the AUT 240.

The scanner 210 may add one or more custom headers to each application request, wherein the custom headers include information that the runtime agent 250 may use to diagnose a vulnerability related to an attack in progress. Information within the custom header can include information that a particular field of the AUT 240 should be marked as sensitive and that data entering the field should be tracked and information about whether that data was adequately protected reported back. Moreover, in some examples, the AUT custom header can include information that a particular data entered at a field should be tracked and information about whether that data was adequately protected reported back. As noted above, this can be in the form of an indication that the field should be considered sensitive by the runtime agent.

The scanner 210 may also use custom request headers to generate requests that target the runtime agent 250 to obtain additional information regarding the internal processes performed by the AUT 240, or information about AUT 240, the server, or the runtime agent 250. Requests targeting the runtime agent 250 may be referred to as service requests, and responses received from the runtime agent 250 may be referred to as service responses. Service responses issued by the runtime agent 250 may include supplemental information in the body of the service response, as described further below.

In various examples, the runtime agent 250 is configured to receive the application requests and the service requests sent from the scanner 210 to the AUT 240. The runtime agent 250 may then analyze the header information to determine whether the request is an application request or a service request. Upon receiving an application request, the runtime agent 250 may analyze the header information to acquire data used by the runtime agent 250 regarding the specific application request. Application requests may then be delivered by the runtime agent 250 to AUT 240 for processing by the AUT 240 according to the AUT's programming. When the AUT 240 generates the application response, the runtime agent 250 may add one or more custom headers to the application response to send additional information back to the scanner 210.

In some examples, per-request headers may be custom HTTP headers that include a custom field name followed by one or more field values that are understood by the runtime agent 250 and the scanner 210. In these examples, the custom HTTP headers are ignored by the AUT 240. It will be appreciated that the field names described herein are merely used as examples of field names that could be used in a particular implementation and are not intended to limit the scope of the claims.

In certain examples, the data entered in the field by the scanner 210 can be considered a probe. The runtime agent 250 can observe the APIs that are exercised by the probe. The runtime agent 250 can be aware of the probe based on a per-request header. For example, the per-request header may include a memo header used to coordinate the interaction between the scanner 210 and the runtime agent 250. In some examples, the scanner 210 may add a memo header probe and/or trace request. The runtime agent 250 may use the memo header identify an attack string associated with the probe. As an example, the memo header may be formatted as follows:

X-Scan-Memo: <AttackString>/<OtherInformation>

In response to an application request for a probe/trace, the runtime agent 250 may determine the effect of the application request by determining, for example, particular lines of code that have been executed by the AUT 240, files that have been accessed by the AUT 240, database queries executed by the AUT 240, or other information. In particular, the data entered in the field can be monitored to determine where it goes. This can be used to determine whether an adequate protective measure has been used on it. For example, if the data does not leave the AUT 240, then a protective measure may not need to be taken. On the other hand, if a password was stored in a database, a salted hash process may be set as criteria for an adequate protective measure. Further, a social security number, medical record, etc. may be associated with criteria for a secure encryption process.

Each trace may include the Request ID of the application request and the application response that corresponds with the trace. The scanner 210 can learn about the internal operations of the AUT 240 that were triggered by a particular application request by retrieving the corresponding trace from the runtime agent 250. To retrieve a trace, the scanner 210 may issue a service request to the runtime agent 250 that includes a header field name/value pair configured to indicate the request of the trace corresponding to a particular application request or response, for example, for particular probes or sets of probes. For example, the field name/value pair for requesting a trace may be formatted as follows:

Trace=<request_id>

The value <request_id>is the value assigned by the scanner 210 or the runtime agent 250 that corresponds with the application request and/or application response associated with the requested trace. Upon receiving the trace service request, the runtime agent 250 may bypass the AUT 240 and generate a service response that includes the requested trace. In certain examples, the requested trace may be retrieved by the runtime agent 250 from the buffer and added to the body of the service response, which may then be sent to the scanner 210. Further, in some examples, the service response header includes the request_id value of the requested trace, and the body of the service response may be formatted as a JSON object.

The runtime agent 250 may monitor processes performed by the AUT 240 that occur outside the context of an application request, such as processes initiated by the additional monitor code injected by the runtime agent 250. To avoid incurring an unacceptable level of performance overhead, the runtime agent 250 may be configured to minimize the performance overhead of monitoring processes that are unrelated to application requests. For example, the performance overhead may be minimized by injecting the monitor code to selectively monitor specific API calls and relevant portions of the AUT's user code (e.g., areas associated with crypto calls, hashing, input/output, etc.).

As noted, crawling the AUT 240 allows the scanner 210 to be able to identify attack surface. This can be done by fetching attack surface from the server-side agent, following links, executing scripts, etc. If the request to the application contains any sensitive information, this can be communicated to the runtime agent 250 through the request headers. Each crawl request can be followed by a trace request to the runtime agent 250 requesting for information that was collected by the runtime agent 250 during the execution of the application request. Buffers can be used to transfer groups of information. The information collected is then stored in the scanner's storage so that it can be used later.

In one example, the component in the scanner 210 that is responsible for identifying vulnerabilities is referred to as an audit engine 260. Multiple audit engines 260 can be present in the scanner 210 and each engine would be responsible for performing a given type of task/attack. For example, a crypto engine could be responsible for analyzing responses from the runtime agent 250 and flagging a vulnerability if necessary. The crypto engine can read from the scanner storage and inspect crawl requests with sensitive information and their corresponding trace responses. If a trace response contains information about the presence/absence of a cryptographic function in the application, then the engine performs further analysis to determine a vulnerability.

Because the runtime agent 250 is installed in the application server, it has visibility into the behavior of the application. If the scanner 210 sends a request with a note to observe a given string, then the runtime agent 250 can look at specific function calls to see if the string is being used in a given way.

In this case, the runtime agent 250 can monitor well-known, recommended cryptographic APIs and observe if the given string (e.g., sensitive information) is used correctly at these points. In one example, if no cryptographic function is called, then the agent does not send anything to the scanner and the scanner understands that the information was used insecurely. Otherwise, the runtime agent 250 would observe the execution of a known, recommended cryptographic function and send the details to the scanner 210 on a subsequent trace request. In some examples, whether the AUT 240 outputs (e.g., sends via a communication, sends to database, sends to log, etc.) the information using another API can also be used to determine whether it is adequately protected.

Along with crypto APIs, the runtime agent 250 can observe other application behaviors as well to understand the complete workflow. For example, if a password string submitted by the scanner 210 goes through a SQL query without going through a crypto call, then this could potentially mean that the password is stored insecurely. This can be flagged. The runtime agent 250 does not need to track sensitive information from the scanner 210 alone. It can also identify information that is read and handled incorrectly in the server itself. For example, an application reads a credit card number from the database, decrypts the value (so the number was securely stored in the first place), and then writes it into a log in clear text. This behavior does not involve information sent from the scanner 210, but is another form of information leakage that can be detected by the runtime agent 250 and sent to the scanner 210 for processing.

Figure 3:
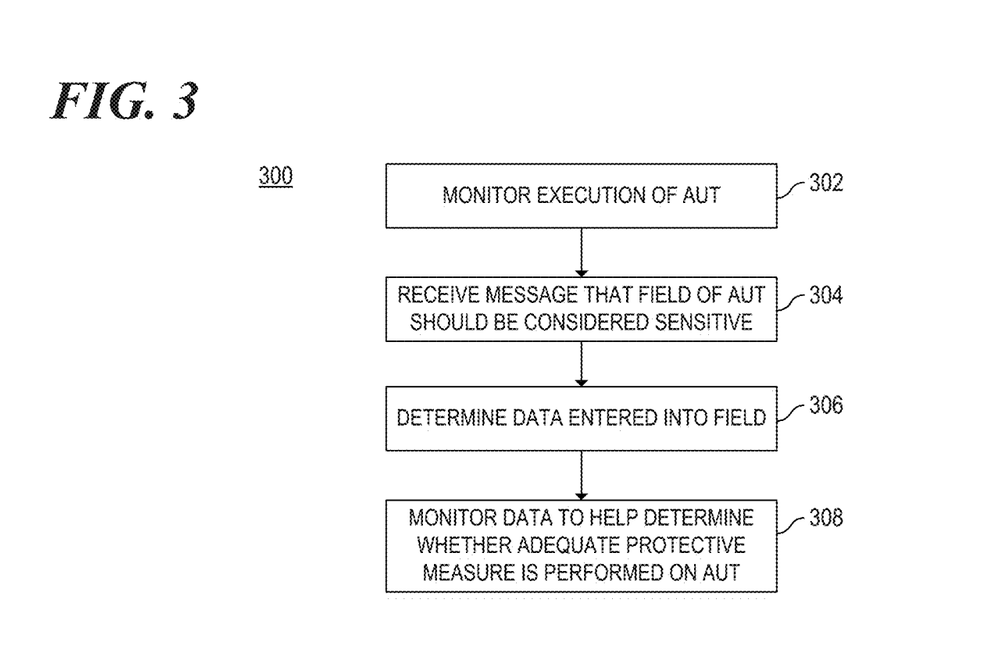
FIG. 3 is a flowchart of a method for determining whether an adequate protective measure is performed on sensitive data, according to one example.
Figure 4:
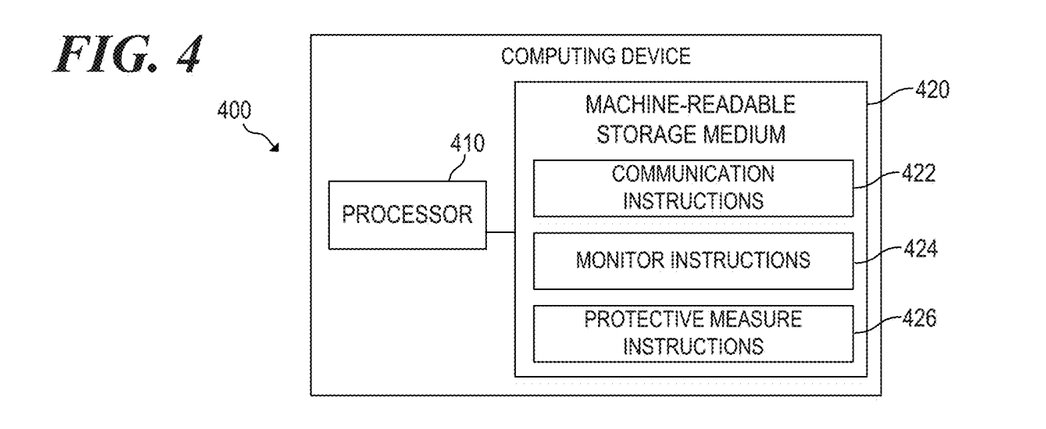
FIG. 4 is a block diagram of a computing device capable of determining whether an adequate protective measure is performed on sensitive data, according to one example.

FIG. 3 is a flowchart of a method for determining whether an adequate protective measure is performed on sensitive data, according to one example. FIG. 4 is a block diagram of a computing device capable of determining whether an adequate protective measure is performed on sensitive data, according to one example. Although execution of method 300 is described below with reference to computing device 400, other suitable components for execution of method 300 can be utilized (e.g., computing systems 100 and/or 200). Additionally, the components for executing the method 300 may be spread among multiple devices. Method 300 may be implemented in the form of executable instructions stored on a machine-readable storage medium, such as storage medium 420, and/or in the form of electronic circuitry.

The computing device 400 includes, for example, a processor 410, and a machine-readable storage medium 420 including instructions 422, 424, 426 for facilitating a security test on an AUT. Computing device 400 may be, for example, a notebook computer, a desktop computer, a workstation, a server, a slate computing device, or any other computing device capable of performing the functionality described herein.

Processor 410 may include, at least one central processing unit (CPU), at least one semiconductor-based microprocessor, at least one graphics processing unit (GPU), other hardware devices suitable for retrieval and execution of instructions stored in machine-readable storage medium 420, or combinations thereof. For example, the processor 410 may include multiple cores on a chip, include multiple cores across multiple chips, multiple cores across multiple devices (e.g., if the computing device 400 includes multiple node devices), or combinations thereof. Processor 410 may fetch, decode, and execute instructions 422, 424, 426 to implement method 300. As an alternative or in addition to retrieving and executing instructions, processor 410 may include at least one integrated circuit (IC), other control logic, other electronic circuits, or combinations thereof that include a number of electronic components for performing the functionality of instructions 422, 424, 426.

Machine-readable storage medium 420 may be any electronic, magnetic, optical, or other physical storage device that contains or stores executable instructions. Thus, machine-readable storage medium may be, for example, Random Access Memory (RAM), an Electrically Erasable Programmable Read-Only Memory (EEPROM), a storage drive, a Compact Disc Read Only Memory (CD-ROM), and the like. As such, the machine-readable storage medium can be non-transitory. As described in detail herein, machine-readable storage medium 420 may be encoded with a series of executable instructions for performing a security test based on attack suggestions.

The computing device 400 can host an application under test. A runtime agent can implement monitor instructions 424 to monitor execution of the AUT (302). A scanner or other security test engine can perform a security test on the AUT. Communication instructions 422 can be executed by processor 410 to communicate with the security test. The scanner can crawl the AUT and perform attack vectors. In one example, the scanner can determine that a field of the AUT is associated with sensitive information (e.g., the field asks for information that the scanner determines to be sensitive for some reason (e.g., based on name, based on input, etc.)). The scanner can send a message to the runtime agent identifying the field. Further, in some examples, the scanner can provide additional information such as the type/context of sensitive information and/or information about data entered into the field to track.

At 304, the computing device 400 receives, from the security test connected through a common communication channel, a message that a field of the AUT should be considered sensitive. Communication instructions 422 can be executed to handle the message. At 306, the monitor instructions 424 can be executed by processor 410 to determine data entered into the field of the AUT. The determination can be based on a communication from the security test (e.g., via a message identifying the data) and/or based on monitoring of the field by the runtime agent. Moreover, the type of the data can be based on a communication from the security test.

At 308, the runtime agent can execute monitor instructions 424 to monitor the data during execution of the AUT. Protective measure instructions 426 can be executed to determine whether a protective measure is performed on the data. In some examples, a determination can be made as to whether the protective measure meets criteria is performed on the data. In other examples, the information is sent back to the security test, which can make the determination. Criteria is a standard for judgment and a rule or principle for evaluating the protective measure. One or more criterions can be included in the criteria. In some examples, the runtime agent can look for particular protective measures (both measures considered adequate and inadequate) and provide that information to the security test.

In one example, the computing device 400 can determine an output of the data from the AUT. The output can be, for example, to a database, a communication outside of the AUT, a log, etc. A list of recommended protective measures for the data can be determined based on the output, the type, combinations thereof, etc. For example, the list may include recommended functions associated with data type X and output Y. A data structure can be able to hold multiple different types of combinations of the type, the output, and/or other information. The runtime agent can follow the data to a cryptographic function that is used. If the data is output without a cryptographic function, the runtime agent can send a message to the security test of the information and/or that criteria was not met. In other examples, the runtime agent can be silent and the security test can be programmed to assume that the silence means that the criteria was not met. If a process on the list is used, the runtime agent can provide that information to the security test. In some examples, the runtime agent can determine that the protective measure (the cryptographic process) meets the criteria if the process used was on the list.

As noted above, in one example, the type of data is data to be validated. In this scenario, the list can include a set of protective measures such as a salted hash process. The criteria can be met if one of a set of particular salted hash processes was used on the data. Examples of this type of data may include a password, other credentials, etc.

In another example, the type of data is data to be stored and retrieved. Here, the criteria can include at least one secure cryptographic function. Varying types can be determined and customized to be associated with particular protective measures (e.g., encryption processes, salted hash functions, etc.). As noted above, a whitelisting approach can be used.

Feedback can be provided to the security test of whether the protective measure meeting the criteria has been taken.

In some examples, the security test can make the judgment decision of whether the protective measure meets the criteria, while the runtime agent provides information as to what processes are performed on the data (e.g., any cryptographic function, output functions, etc.).

Figure 5:
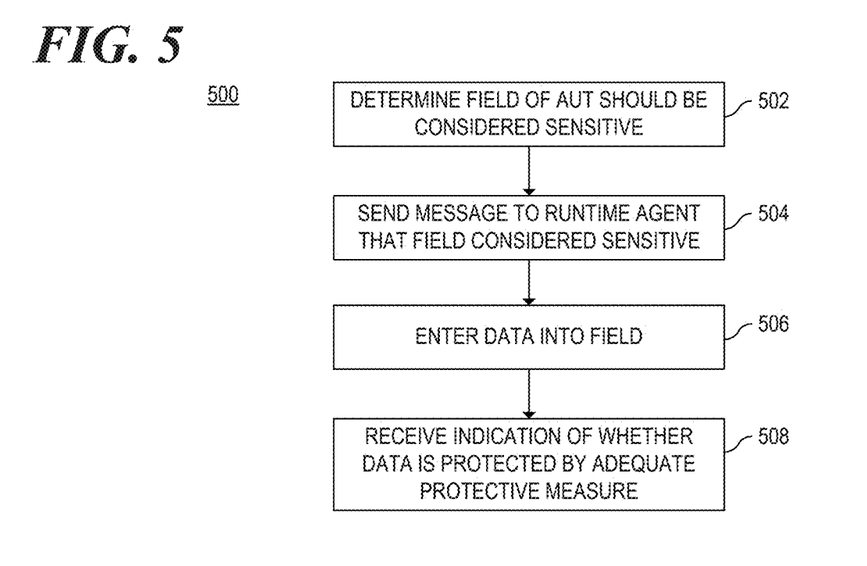
FIG. 5 is a flowchart of a method for determining whether a field should be considered sensitive and requesting a trace of data entered into the field to determine whether that data is adequately protected.
Figure 6:
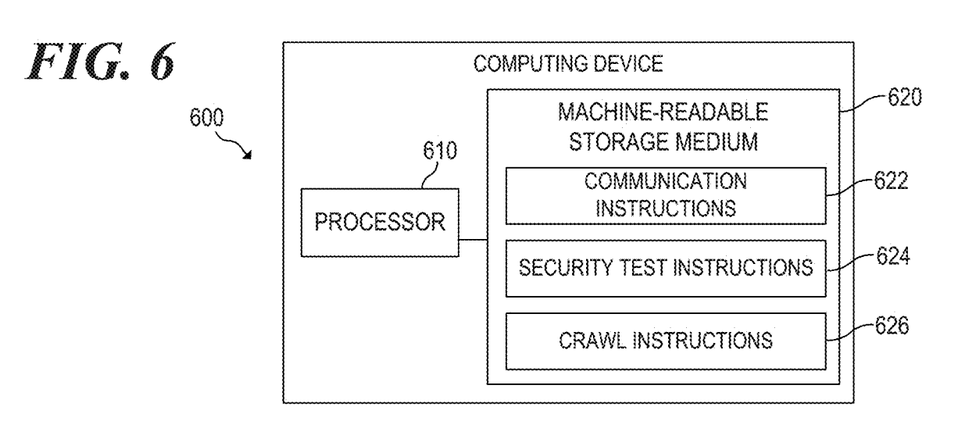
FIG. 6 is a block diagram of a computing device capable of determining whether a field should be considered sensitive and requesting a trace of data entered into the field to determine whether that data is adequately protected.

FIG. 5 is a flowchart of a method for determining whether a field should be considered sensitive and requesting a trace of data entered into the field to determine whether that data is adequately protected. FIG. 6 is a block diagram of a computing device capable of determining whether a field should be considered sensitive and requesting a trace of data entered into the field to determine whether that data is adequately protected. Although execution of method 500 is described below with reference to computing device 600, other suitable components for execution of method 500 can be utilized (e.g., computing systems 100 and/or 200). Additionally, the components for executing the method 500 may be spread among multiple devices. Method 500 may be implemented in the form of executable instructions stored on a machine-readable storage medium, such as storage medium 620, and/or in the form of electronic circuitry.

The computing device 600 includes, for example, a processor 610, and a machine-readable storage medium 620 including instructions 622, 624, 626 for performing a security test on an AUT. Computing device 600 may be, for example, a notebook computer, a desktop computer, a workstation, a server, or any other computing device capable of performing the functionality described herein.

Processor 610 may be, at least one central processing unit (CPU), at least one semiconductor-based microprocessor, at least one graphics processing unit (GPU), other hardware devices suitable for retrieval and execution of instructions stored in machine-readable storage medium 620, or combinations thereof. For example, the processor 610 may include multiple cores on a chip, include multiple cores across multiple chips, multiple cores across multiple devices (e.g., if the computing device 600 includes multiple node devices), or combinations thereof. Processor 610 may fetch, decode, and execute instructions 622, 624, 626 to implement method 500. As an alternative or in addition to retrieving and executing instructions, processor 610 may include at least one integrated circuit (IC), other control logic, other electronic circuits, or combinations thereof that include a number of electronic components for performing the functionality of instructions 622, 624, 626.

Machine-readable storage medium 620 may be any electronic, magnetic, optical, or other physical storage device that contains or stores executable instructions. Thus, machine-readable storage medium may be, for example, Random Access Memory (RAM), an Electrically Erasable Programmable Read-Only Memory (EEPROM), a storage drive, a Compact Disc Read Only Memory (CD-ROM), and the like. As such, the machine-readable storage medium can be non-transitory. As described in detail herein, machine-readable storage medium 620 may be encoded with a series of executable instructions for performing a security test based on attack suggestions.

A server can host an application under test. The computing device 600 can perform a security test on the AUT. Crawl instructions 626 can be executed to crawl the AUT to determine an attack surface of the AUT. Communication instructions 622 can be executed to communicate with the AUT to implement the crawl (e.g., via a network interface card or other communication device).

At 502, the computing device can determine a field of the AUT that should be considered sensitive. This can be accomplished automatically and/or via input from a user. In one example, the computing device 600 can parse information of the web application to determine keywords (e.g., username, password, social security number, phone number, address, birth date, etc.) near the field to determine whether the field is to be considered sensitive. In another example, the computing device can receive input about whether a particular field should be considered sensitive. In a further example, the computing device can flag a field based on analysis of the page crawled and provide that information to a user for confirmation.

At 504, the communication instructions 622 can be executed to send a message to a runtime agent associated with the AUT that the field is considered sensitive. At 506, the security test instructions 624 can be executed to enter data into the field. In some examples, other information can be provided to the runtime agent (e.g., the type of sensitive information, context, etc.). The runtime agent can then follow data to determine whether the data has been output and/or had a protective measure implemented upon the data. The runtime agent can return an in indication of whether the data has been protected by an adequate protective measure that the computing device 600 can receive (508).

In some examples, the runtime agent follows the data and provides the computing device 600 with information about whether the data has been protected by a process and/or provide each process that was implemented on the data. In these examples, the computing device 600 can determine whether the protective processes were adequate. As noted above, the protective processes can be considered adequate if they meet set criteria (e.g., use a particular type of process based on a particular type of sensitive data).

What is claimed is:

1. A non-transitory machine-readable storage medium storing instructions that, when executed by at least one processor of a device, cause the device to:
    monitor execution of an application under test (AUT) to execute on a server;
    receive, from a security test connected through a common communication channel, a message that a field of the AUT should be considered sensitive;
    determine data entered into the field of the AUT;
    determine that a protective measure is performed on the data; and
    determine whether the protective measure performed on the data meets a criteria,
        wherein to determine whether the protective measure meets the criteria, the instructions are to cause the device to:
        determine a type of the data;
        determine, based on the determined type of the data, a list of recommended protective measures for the data, the recommended protective measures corresponding to the determined type of the data; and
        determine whether the protective measure performed on the data meets the criteria based on the protective measure performed on the data being a recommended protective measure in the list of recommended protective measures,
        wherein the type of the data includes a first type of data that a user submits and is to be validated and a second type of data that the AUT is to retrieve on-demand, and
        wherein the list of recommended protective measures for the data of the first type includes hashing processes and the list of recommended protective measures for the data of the second type includes encryption processes.

2. The non-transitory machine-readable storage medium of claim 1, further comprising instructions that, when executed by the at least one processor, cause the device to:
   determine an output of the data from the AUT; and
   determine the type of the data based on the output of the data from the AUT.

3. The non-transitory machine-readable storage medium of claim 1, further comprising instructions that, when executed by the at least one processor, cause the device to:
   provide feedback to the security test of whether the protective measure performed on the data meets the criteria.

4. The non-transitory machine-readable storage medium of claim 1, wherein the type of the data is data to be validated and the protective measure includes a salted hash.

5. The non-transitory machine-readable storage medium of claim 4, wherein the type of the data is data that includes a password.

6. The non-transitory machine-readable storage medium of claim 1, wherein the type of the data is information to be retrieved on demand and the recommended protective measure includes at least one secure cryptographic function.

7. The non-transitory machine-readable storage medium of claim 1, wherein the first type of data includes a password, a token, or a personal identification number (PIN) and the second type of data includes a credit card number or a social security number.

8. A method comprising:
   monitoring execution, by at least one processor, of an application under test (AUT) to execute on a server;
   receiving, from a security test connected through a common communication channel, a message that a field of the AUT should be considered sensitive;
   determining data entered into the field of the AUT;
   monitoring the data during execution of the AUT;
   determining that the data is to be outputted;
   determining that a protective measure is performed on the data; and
   determining whether the protective measure performed on the data meets a criteria by:
      determining a type of the data;
      determining, based on the determined type of the data, a list of recommended protective measures for the data, the recommended protective measures corresponding to the determined type of the data; and
      determining whether the protective measure performed on the data meets the criteria based on the protective measure performed on the data being a recommended protective measure in the list of recommended protective measures,
   wherein the type of the data includes a first type of data that a user submits and is to be validated and a second type of data that the AUT is to retrieve on-demand, wherein the first type of data includes a password, a token, or a personal identification number (PIN) and the second type of data includes a credit card number or a social security number.

9. The method of claim 8, wherein the determination of whether the protective measure performed on the data meets the criteria is further based on the type of the data to be outputted.

10. The method of claim 9, wherein the type of the data is information to be validated and includes a salted hash.

11. The method of claim 9, wherein the type of the data is information to be retrieved and includes at least one secure cryptographic function.

12. The method of claim 8, wherein the list of recommended protective measures for the data of the first type includes hashing processes and the list of recommended protective measures for the data of the second type includes encryption processes.

13. A system comprising:
   a server hosting an application under test (AUT);
   a runtime agent to monitor execution of the AUT;
   a computing device communicatively coupled to the AUT and the runtime agent through a common communication channel, the computing device to:
      determine that a field of the AUT should be considered sensitive;
      send a message to the runtime agent indicating that the field should be considered sensitive;
      enter data into the field,
   wherein the runtime agent is further to:
      receive the message and in response to receipt of the message, monitor the data during execution of the AUT to determine a protective measure performed on the data; and
      determine whether the protective measure performed on the data meets a criteria and provide the protective measure performed on the data to the computing device, wherein to determine whether the protective measure meets the criteria; determine a type of the data;
      determine, based on the determined type of the data, a list of recommended protective measures for the data, the recommended protective measures corresponding to the determined type of the data; and
      determine whether the protective measure performed on the data meets the criteria based on the protective measure performed on the data being a recommended protective measure in the list of recommended protective measures,
   wherein the type of the data includes a first type of data that a user submits and is to be validated and a second type of data that the AUT is to retrieve on-demand, and
   wherein the list of recommended protective measures for the data of the first type includes hashing processes and the list of recommended protective measures for the data of the second type includes encryption processes.

14. The system of claim 13, wherein the computing device is further to:
   determine the list of recommended protective measures for the data based on the type of the data and an output of the data; and
   determine whether the protective measure performed on the data meets the criteria based on a process performed on the data.

15. The system of claim 14, wherein the list includes at least one of a secure cryptographic function and a salted hash.

16. The system of claim 14, wherein the first type of data includes a password, a token, or a personal identification number (PIN) and the second type of data includes a credit card number or a social security number.

* * * * *